(12) United States Patent
Quilici et al.

(10) Patent No.: US 11,252,278 B2
(45) Date of Patent: Feb. 15, 2022

(54) SYSTEM AND METHOD FOR DETERMINING UNWANTED CALL ORIGINATION IN COMMUNICATIONS NETWORKS

(71) Applicant: YouMail, Inc., Irvine, CA (US)

(72) Inventors: Alexander E. Quilici, Malibu, CA (US); Michael J. Rudolph, San Juan Capistrano, CA (US)

(73) Assignee: YouMail, Inc., Irvine, CA (US)

( * ) Notice: Subject to any disclaimer, the term of this patent is extended or adjusted under 35 U.S.C. 154(b) by 0 days.

(21) Appl. No.: 17/005,795

(22) Filed: Aug. 28, 2020

(65) Prior Publication Data

US 2021/0014355 A1 Jan. 14, 2021

Related U.S. Application Data

(63) Continuation of application No. 16/927,139, filed on Jul. 13, 2020, now Pat. No. 10,798,241, which is a
(Continued)

(51) Int. Cl.
*G10L 25/18* (2013.01)
*H04M 3/436* (2006.01)
(Continued)

(52) U.S. Cl.
CPC .............. *H04M 3/436* (2013.01); *G10L 25/51* (2013.01); *H04M 3/2281* (2013.01);
(Continued)

(58) Field of Classification Search
CPC ..................... G06T 11/001; G06T 7/90; G06T 2207/20212; G06T 2207/10048;
(Continued)

(56) References Cited

U.S. PATENT DOCUMENTS

| 9,369,459 B2 | 6/2016 | Galwas |
| 2008/0159501 A1 | 7/2008 | Cai |

(Continued)

FOREIGN PATENT DOCUMENTS

KR 101140084 4/2012

OTHER PUBLICATIONS

PCT International Search Report of PCT/US2020/039562, dated Jul. 30, 2020, International Search Authority.
(Continued)

*Primary Examiner* — Chuong A Ngo
(74) *Attorney, Agent, or Firm* — Meister Seelig & Fein LLP; Seth H. Ostrow, Esq.

(57) ABSTRACT

A method and system for discovering and locating the source of unwanted communication origination in a communications network, the method comprising compiling a communication campaign database storing data of one or more communication campaigns along with automatically identified instances of those campaigns, and simultaneously or sequentially matching those instances against known communication traffic of a set of cooperating telecommunication carriers. The one or more communications campaigns include a grouping of related fingerprints and patterns that identify a sequence of characters, audio or video associated with instances of a same likely campaigns, either legitimate or illegitimate/fraudulent.

18 Claims, 7 Drawing Sheets

Related U.S. Application Data continuation-in-part of application No. 16/451,318, filed on Jun. 25, 2019, now Pat. No. 10,757,252.

(51) Int. Cl.
  *H04M 3/22* (2006.01)
  *H04M 3/42* (2006.01)
  *G10L 25/51* (2013.01)

(52) U.S. Cl.
  CPC ......... *H04M 3/42059* (2013.01); *G10L 25/18* (2013.01); *H04M 2203/558* (2013.01); *H04M 2203/6027* (2013.01)

(58) Field of Classification Search
  CPC ..... G06T 5/50; G01J 5/025; G01J 2005/0077; G01J 5/48; G01N 25/72; G06F 3/0484; G01D 7/00; H04N 7/18; H04M 3/436; H04M 3/2281; H04M 3/42059; H04M 2203/558; H04M 2203/6027; G10L 25/51; G10L 25/18; G10L 15/26
  See application file for complete search history.

(56) References Cited

U.S. PATENT DOCUMENTS

| | | | |
|---|---|---|---|
| 2011/0170680 A1* | 7/2011 | Chislett | H04L 65/1079 379/142.06 |
| 2014/0087280 A1 | 3/2014 | Ogawa et al. | |
| 2015/0087280 A1* | 3/2015 | Farrand | H04M 1/00 455/415 |
| 2015/0148013 A1 | 5/2015 | Baldwin et al. | |
| 2015/0373193 A1 | 12/2015 | Cook | |
| 2018/0007199 A1 | 1/2018 | Quilici et al. | |
| 2018/0205743 A1 | 7/2018 | Mciver et al. | |
| 2020/0067861 A1 | 2/2020 | Leddy et al. | |

OTHER PUBLICATIONS

PCT International Search Report of PCT/US20/33434, dated Jul. 30, 2020, International Search Authority.

\* cited by examiner

SYSTEM AND METHOD FOR DETERMINING UNWANTED CALL ORIGINATION IN COMMUNICATIONS NETWORKS

CROSS REFERENCE TO RELATED APPLICATION

This application is a continuation-in-part of U.S. patent application Ser. No. 16/451,318, entitled "IDENTIFYING, SCREENING, AND BLOCKING OF CALLS FROM PROBLEMATIC TELECOMMUNICATIONS CARRIERS AND NUMBER BLOCKS," filed on Jun. 25, 2019, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to identifying instances of unwanted activity originating on a telecommunications network, and in particular, enabling telecommunications carriers and service providers to identify the sources of scam communications that may originate from their networks.

Description of the Related Art

Telecommunications networks, especially wholesale networks, often have accounts or users that originate communications from their networks that are unwanted by the recipients of those communications, such as scams, fraud or calls that violate telemarketing rules. Further, those accounts or users often spoof their identities when they initiate these communications in an effort to hide their identities to entice users or apps to accept the calls. As such, it is desirable for communications service providers to be able to detect and shut down these users and accounts to prevent such unwanted activities. It is important to do this as expeditiously as possible to minimize the damage unwanted calling activities can cause.

Some service providers may try to use volume heuristics, including the reach and frequency of communications by those originating accounts, to detect these unwanted activities. Those efforts often fail because legitimate communications, such as those from banks, utilities, and other genuine businesses, also communicate to a large volume of people in short order and could be identified as unwanted or suspicious. Similarly, while some carriers may try to detect fraud when a number is spoofed, there are also legal reasons for spoofing (e.g. individual hospital lines using the main number of the hospital), so a blanket assumption that spoofing is always associated with fraudulent activities cannot be made.

Thus, there is a need for improved systems and method for communications service providers to detect when their users or accounts are originating unwanted communications in order to shut them down or take other remedial action.

SUMMARY OF THE INVENTION

The present invention provides a method and system for determining unwanted call origination. According to one embodiment, the method comprises compiling a database storing data organized by communication campaigns, whereby communications related to unwanted or fraudulent activities can be identified and group and separated from communications related to legitimate activities. The one or more communication campaigns may include a grouping of related patterns or fingerprints that identify a sequence of characters, audio or video associated with other instances of same likely campaigns.

The method may further comprise a system whereby collaboration with an originating communications service providers enables better understanding of the behavior of both the wanted and unwanted communications believed to originate from their networks—thereby verifying if an originating address or number actually originated the communication from a network or was spoofed and originated from another communications service provider. The communications service providers may participate in this collaborative process in one or more manners including but not limited to (a) receiving data related to their communication campaigns to compare with their own local data, (b) transmitting or sending parts of their data up to a separate system for analysis or (c) relying completely on the data already present in the disclosed databases or (d) a combination of any or all of the above.

According to one embodiment, the method comprises compiling a communication campaign database storing data of one or more communication campaigns, the one or more communication campaigns including a grouping of related fingerprints that identify a sequence of characters, audio or video speech associated with instances of a same likely communication campaign. The method further comprises providing access to the data, the access provided to a communications service provider or carrier originating the one or more communication campaigns or owning an addresses identified as a source of communications associated with the one or more communication campaigns, wherein the access to the data is used by the communications service provider or carrier to generate feedback based on a determination that the one or more communication campaigns or the communications originated from users or accounts of the communications service provider or carrier. The one or more communication campaigns are determined to be legitimate or illegitimate based on the feedback.

Providing the access to the communications service provider or carrier further comprises providing the communications service provider or carrier with access to an interface that allows a plurality of communications service providers or carriers to collaborate in identifying and classifying behavior of accounts, addresses or communications associated with the plurality of communications service providers or carriers. The method may further comprise determining additional communications service providers to send the instances of the one or more communication campaigns. The one or more instances of the one or more communication campaigns may be sent to the additional communications service providers or carriers for further identification and analysis on the communication's true origination. The collaboration may include an indication that a given communications service provider or carrier originated the communications or communication addresses were co-opted by another communications service provider, or a network associated with the given communications service provider or carrier was an intermediary from an additional communications carrier.

The data may reflect behavior of communications that originate from a network associated with the communications service provider or carrier useable for independent analysis. The one or more instances of the one or more communications campaigns may include data including a recipient address including a phone number, an originating address, a timestamp, or a facilitating communications service provider or carrier. In one embodiment, the instances of the same likely communication campaign include data relevant to a non-interconnected communications network where numeric addresses other than phone numbers are used to identify source and destination parties that facilitates grouping of communication campaigns as being originated to one or more of a set of originating addresses. The method may further comprise identifying an attribution of the one or more communication campaigns to a plurality of communications service providers or carriers. In another embodiment, the method may further comprise receiving the feedback from the communications service provider or carrier, the feedback including a matching of an instance of a given one of the one or more communication campaigns to evidence of origination at the communications service provider or carrier, and transmitting additional instances of supporting communications of the given communication campaign from a history of instances of communications originated or received by the communications service provider or carrier.

According to one embodiment, the system comprises a communication campaign database that stores data of one or more communication campaigns, the one or more communication campaigns including a grouping of related fingerprints that identify a sequence of characters, audio or video speech associated with instances of a same likely communication campaign. The system further comprises a communication campaign analysis system configured to provide access to the data, the access provided to a communications service provider or carrier originating the one or more communication campaigns or owning an addresses identified as a source of communications associated with the one or more communication campaigns, wherein the access to the data is used by the communications service provider or carrier to generate feedback based on a determination that the one or more communication campaigns or the communications originated from users or accounts of the communications service provider or carrier. The communication campaign analysis system further configured to determine that the one or more communication campaigns are legitimate or illegitimate based on the feedback.

The communication campaign analysis system may be further configured to provide the communications service provider or carrier with access to an interface that allows a plurality of communications service providers or carriers to collaborate in identifying and classifying behavior of accounts, addresses or communications associated with the plurality of communications service providers or carriers. In another embodiment, the communication campaign analysis system may be further configured to determine additional communications service providers to send the instances of the one or more communication campaigns. The communication campaign analysis system can be further configured to send the one or more instances of the one or more communication campaigns to the additional communications service providers or carriers for further identification and analysis on the communication's true origination. The collaboration may include an indication that a given communications service provider or carrier originated the communications or communication addresses were co-opted by another communications service provider, or a network associated with the given communications service provider or carrier was an intermediary from an additional communications carrier.

The data may reflect behavior of communications that originate from a network associated with the communications service provider or carrier useable for independent analysis. The one or more instances of the one or more communications campaigns may include data including a recipient address including a phone number, an originating address, a timestamp, or a facilitating communications service provider or carrier. The instances of the same likely communication campaign may include data relevant to a non-interconnected communications network where numeric addresses other than phone numbers are used to identify source and destination parties that facilitates grouping of communication campaigns as being originated to one or more of a set of originating addresses. In one embodiment, the communication campaign analysis system is further configured to identify an attribution of the one or more communication campaigns to a plurality of communications service providers or carriers. In another embodiment, the communication campaign analysis system is further configured to receive the feedback from the communications service provider or carrier, the feedback including a matching of an instance of a given one of the one or more communication campaigns to evidence of origination at the communications service provider or carrier, and transmit additional instances of supporting communications of the given communication campaign from a history of instances of communications originated or received by the communications service provider or carrier.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Figure 1:
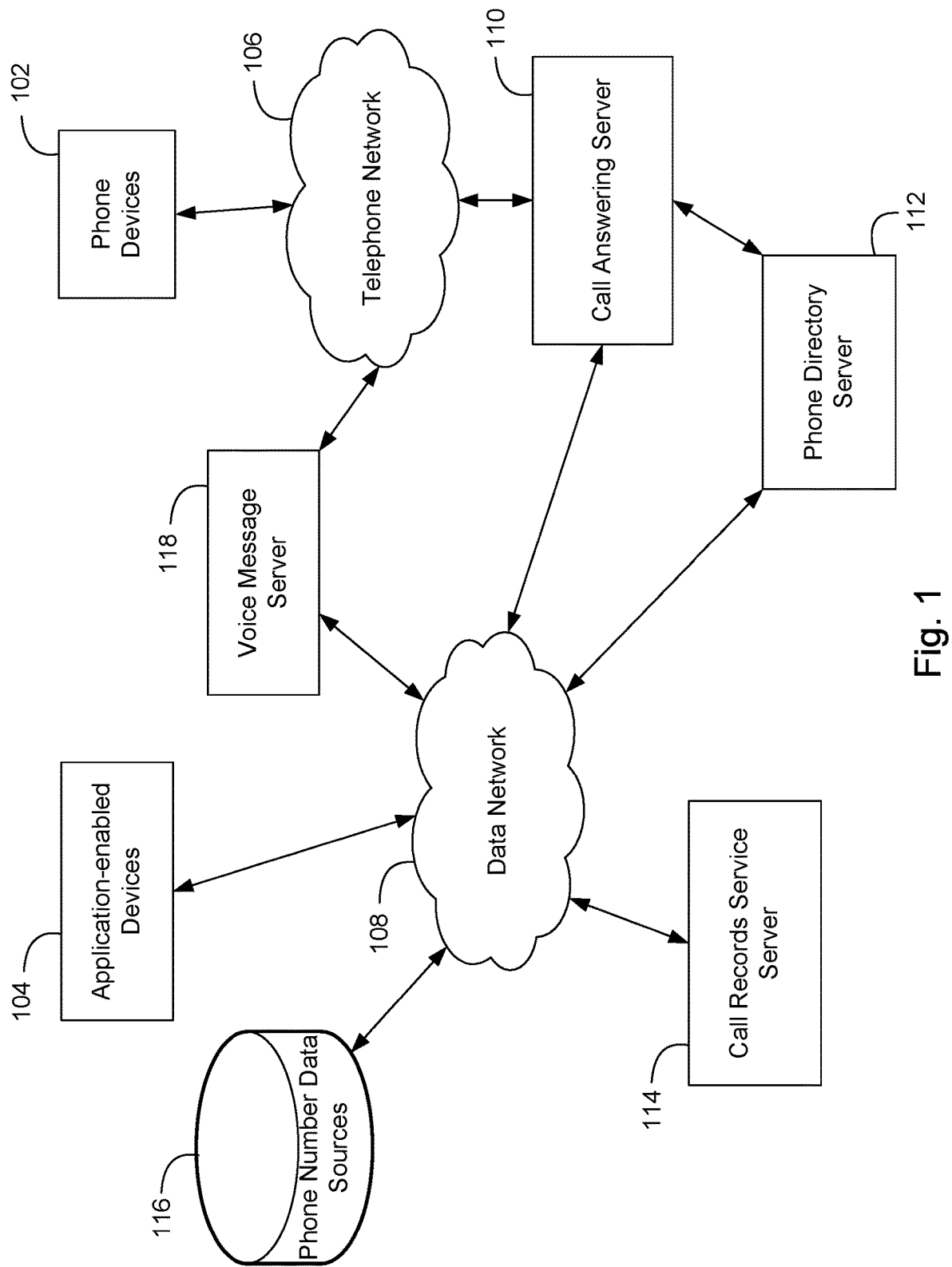
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses systems and method for detecting desirable and undesirable behavior in the communications related to given telecommunications carriers and the utilization of such in the handling of calls from such carriers in the absence or presence of other information about a given communication. Problematic telecommunications carrier behavior may include a carrier originating large amounts of unwanted calls. The carriers may purchase blocks of numbers e.g., 1000 consecutive numbers, which can then be given to their customers to use. For example, certain telecommunications carriers may acquire blocks of phone numbers and wholesale them to customers, such as "robocallers" who are more likely to purchase blocks of numbers. Examples of such carriers may include Peerless Network, Paetec Communications, Teleport Communications, XO Communications, and Broadview Networks. Calls originating from such carriers may be handled with additional scrutiny by, for example, running tests on the data in the call, requiring the caller to authenticate or verify their identity, provide audio challenges, or blocking calls. The additional scrutiny could be determined to be applicable or inapplicable depending on if the incoming communication matches the phone number of a stored contact on the receiving telecommunication device. These carriers may also be scored based on a percentage of calls originating from numbers they acquired being unwanted calls (e.g., spam and robocallers). Calls originating from carriers with scores reflecting high undesirable traffic or other questionable attributes may be scrutinized more often and handled under more stringent screening procedures. At least one disclosed system may identify carriers having large amounts of unwanted call traffic and block calls or otherwise provide different levels of screening for calls from such carriers unless specified, e.g., placed on a whitelist.

The present application also discloses a system and method for detecting unwanted communications and determining origination of the unwanted communications on service provider networks. Communications, such as calls, text messages, audio, video, or multimedia messages, etc., may be unwanted if the originators or the content of their communications are associated with illegal, fraudulent, or other activities in violation of a communications service provider's rules or policies, such as harassment, etc. The disclosed system and method may provide a solution for communications service providers to protect their networks from originating unwanted communications by quickly detecting when unwanted communications are being made. This is made possible through a sampling of those communications along or at the terminating endpoint of those communications that can analyze the content of those communications and compare it against a known set of wanted or unwanted communications (e.g., a voicemail received by a person from a phone number can have that voicemail's content compared against known statements that an identity thief might make when leaving a voicemail).

The system presented in FIG. 1 includes phone devices 102 (such as landline, cellular, analog, digital, satellite, radio, etc.), that are capable of establishing and receiving telephonic communications via a public telephone network 106, as well as application-enabled devices 104 that are capable of establishing and receiving telephonic communications via the data network 108 (e.g., using Voice over Internet Protocol ("VoIP")). In some embodiments, the application-enabled devices 104 are enabled with an application such as the one available from YouMail Inc., www.youmail.com, the assignee of the present patent application. The presence of a voice message server 118 is optional and not required in the system, but if present can be utilized to augment available data.

According to one embodiment, the data network 108 may include the Internet or a private VPN (virtual private network), or any other communications network. Application-enabled devices 104 may be a computing device capable of executing a telephony-related application (e.g., WiFi calling system, VoIP phone, etc.). Examples of computing devices include personal computers, television set top boxes, mobile smartphones, laptops, personal digital assistants (PDA), tablet computers, e-book readers, smartwatches and smart wearable devices, or any computing device having a central processing unit and memory unit capable of connecting to a communications network. The computing device may also comprise a graphical user interface (GUI) or a browser application provided on a display (e.g., monitor screen, LCD or LED display, projector, etc.). A computing device may also include or execute an application to communicate content, such as, for example, textual content, multimedia content, or the like. A computing device may also include or execute an application to perform a variety of possible tasks, such as browsing, searching, playing various forms of content, including streamed audio and video. A computing device may include or execute a variety of operating systems, including a personal computer operating system, such as a Windows, Mac OS or Linux, or a mobile operating system, such as iOS, Android, or Windows Mobile, or the like. A computing device may include or may execute a variety of possible applications, such as a computing software application enabling communication with other devices, such as communicating one or more messages, such as via email, short message service (SMS), or multimedia message service (MMS).

The system further includes a call records service server 114, a phone directory server 112, and a call answering server 110. These servers may vary widely in configuration or capabilities, but generally a server each includes one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Call records service server 114 is able to accumulate phone numbers (or addresses, or unique IDs) and information about the phone numbers from a variety of sources that can be used to determine if a given phone number is that of e.g., an unwanted communicator, or a wanted communicator. One such source is the application-enabled devices 104, which may send a list or log of calls made and received, recordings or transcriptions of phone call conversations (e.g., voicemail transcription systems, such as, one provided by the application from YouMail as mentioned above), text messages, and a list of contacts including phone numbers and associated IDs to the call records service server 114 over the data network 108. Other sources may include voice message server 118 and call answering server 110. Voice message server 118 and call answering server 110 may perform voice mail operations such as recording (and/or transcribing) voice messages for subscribers of phone devices 102 and application-enabled devices 104, where the recorded or transcribed voice messages can be forwarded to call records service server 114. The call answering server 110 may optionally present challenges to communications and the details of interacting with those challenges can be made available to or sent to the call records service server 118. Yet another source of information for accumulation in the call records service server 114 include publicly available phone number data sources 116, such as, telephone listings and directories, electronic yellow pages, and the like. Call records service server 114 may search phone number data sources 116 for information about certain numbers including information about their carrier, the owner of the numbers, addresses, etc. Still other possible sources of information for populating the call records service 114 include cell phone billing records, telephone and cable service provider records such as CDRs (call detail records), and the like.

In at least one embodiment, the call records service server 114 may create one or more databases including "fingerprints" or digital signatures of known recordings of calls or messages (voice and/or text) from unwanted or wanted communicators by using speech processing, natural language processing, and machine learning algorithms with the information accumulated from the variety of sources. Each fingerprint may uniquely identify a sequence of characters or audio fingerprint such as a spectrogram designed to capture the content of, for example, a commonly appearing or known audio phrase or message. In another embodiment, a fingerprint may comprise a tag cloud, or alternatively, a weighted list, that includes each keyword that appears in the message and the number of times each keyword appears in the message that is used to summarize the content. A tag cloud (also known as, a word cloud or a text cloud) may comprise a representation of text content data including keywords or tags, and an emphasis of importance of each keyword or tag that may be indicated with a variety of indicators, such as, ranking, arrangement, classification, word count, font size and color. Further description and details of fingerprinting are described in further detail in commonly owned U.S. Pat. No. 10,051,121, entitled "SYSTEM AND METHOD FOR IDENTIFYING UNWANTED COMMUNICATIONS USING COMMUNICATION FINGERPRINTING" which is herein incorporated by reference in its entirety.

The phone directory server 112 may receive or retrieve the phone numbers and information about the phone numbers from the call records service server 114. For each phone number, indications of likelihood that the phone number is that of an unwanted communicator may be provided by call records service server 114 to the phone directory server 112. Phone directory server 112 may include logic that determines the likelihood that a particular number is that of an unwanted communicator based on the information about the phone numbers from records service server 114 by using the techniques described herein. For example, the indication of likelihood may be represented by a binary flag indicating whether or not the number has been determined as exceeding a threshold value set as likely to be that of an unwanted communicator. Alternatively, the likelihood may be represented with a score value computed as the likelihood of representing an unwanted communicator based on a set of quantitative rules. In another embodiment, an indication may be retrieved from the call records service server 114 that explicitly identifies a phone number as an unwanted communicator (or categorized otherwise). Phone directory server 112 may also match inbound calls or messages with the known fingerprints from records service server 114 to calculate a score that reflects a degree of overlap between the inbound calls or messages and one or more fingerprints.

The logic of phone directory server 112 may additionally use various sets of rules to help it determine the likelihood or probability of a number being that of an unwanted communicator. For example, phone directory server 112 may also factor in the carrier from which the call originated. Certain carriers are associated with a high percentage of robocalls and are suspected or known to traffic with robocalling business. Other carriers may be set to have known attributes that affect the likelihood of wanted or unwanted calls, such as the carrier having taken additional steps to ensure calls from their network are not spoofed. The phone directory server 112 system may track a total volume or percentage of robocalls/unwanted communications associated with carriers or block of numbers belonging to the carriers and dynamically score the carriers or block of numbers (collectively referred to as a "carrier score"). If a given carrier score exceeds a threshold, either as an absolute number, e.g., 50% (of traffic being undesirable or questionable), or in comparison to other carriers or block of numbers, the associated carrier/block of numbers may be identified as bad or suspicious. There could be levels based on scores where different measures are taken depending on the level. For example, audio challenges, such as CAPTCHA ("completely automated public Turing test to tell computers and humans apart"), may be deployed on callers with difficulty levels that are influenced by the carrier score. In another example, a coding system e.g., color coding presented to a recipient the level of likelihood a caller being an unwanted caller/robocaller, that is based at least in part on the carrier score.

The phone directory server 112 may monitor carrier traffic (e.g., reported by users, by analyzing communication content features (or fingerprints) being associated with either wanted or unwanted communicators, and/or by identifying likelihood of a wanted or unwanted communicator) and adjust their score accordingly so the carrier's or block of number status can change dynamically. The carrier scoring may also take into account how the robocallers (or other bad callers) got on their network. For example, if the robocallers were detected as neighborhood spoofers, the carrier would not be penalized for those bad callers. The percentage of unknown callers, that is, not just those determined to be unwanted/robocalls but those that are simply unknown, on a carrier may also be tracked and factored into the dynamic scoring. Some carriers may sell numbers to other entities, and chains of custody may be tracked to determine which carrier is attributed to the activities of the numbers. In other cases, a current traffic from blocks of numbers that belong to a carrier may be identified as a block rather than a carrier. For example, a spammer may obtain a block of 100 numbers from a given carrier and begin a pattern of sequentially using those numbers to place unwanted calls. This block of 100 numbers could be cataloged in a manner that weighs that block as unwanted rather than the entire carrier.

The call answering server 110 may be configured to screen or filter calls to phone devices 102 and application-enabled devices 104. Calls directed to phone devices 102 and application-enabled device 104 may be intercepted by call answering server 110. Phone directory server 112 may be queried by call answering server 110 to identify whether inbound calls to the receiving devices from specific numbers are likely to be from either unwanted communicators or wanted communicators. The call answering server 110 may also determine that the inbound calls are associated with carriers identified as bad or suspicious or match fingerprints from unwanted communicators and can take various measures.

If call answering server 110 determines that the given number is likely to be the number of an unwanted communicator, such as from a suspicious carrier or carrier block, calls from the given number can be handled appropriately (e.g., silenced, marked as spam, etc.) as suspect calls unless the user has placed the given communicator on their white/permitted caller lists or if the call is matched to one or more fingerprints that identifies it as a wanted call. Alternatively, additional tests could be run on those calls by default such as audio CAPTCHA, or users could be given the option whether to accept calls from that carrier. Another option is to block phone numbers in a block/series of range of numbers, e.g., a block of 1000 numbers which gets purchased by carriers, or matched patterns based on an origination and destination phone number. For example, if a carrier carries a communicator with the number "646-123-4567," the system may block all number ranging from "123-4000" through "123-4999."

Call answering server 110 may also respond to unwanted communicator calls by playing an appropriate message containing special information tones (SIT) to indicate out of service or disconnect tones to the unwanted communicator and terminate the call. On playing the message, the call answering server 110 may combine or create messages from the carrier of the user and/or the carrier of the communicator to provide a message identical to that the carrier would play for a disconnected number. The message played by call answering server 110 need not be a generic message but can simulate an actual "telco" experience. For example, if a user is a subscriber from a specific carrier, call answering server 110 may play the carrier's specific audio to an unwanted communicator.

Numbers that are determined as being unlikely from an unwanted communicator (or likely from a wanted communicator) may be allowed to call phone devices 102 or application-enabled devices 104 or directed to voice mail operations such as playing a message that the subscriber of the receiving phone device is unavailable and the communicator may record a voice message. Alternatively, the call answering server may intercept calls from an unwanted communicator and perform any of the following: 1) report to the communicator that the person they are calling does not accept these kinds of calls, 2) report to the communicator that the person they are calling does not accept any calls, and 3) hang up on the communicator and/or optionally play a disconnected message. Handling of calls from communicators can be equally applied to other communications such as SMS (short message service)/text messaging or the like which are carried by carriers (as opposed to transmitted over WiFi). Further description and details of call answering systems are described in further detail in commonly owned U.S. Pat. No. 9,591,131, entitled "SYSTEM AND METHOD FOR IDENTIFYING UNWANTED CALLERS AND REJECTING OR OTHERWISE DISPOSING OF CALLS FROM SAME" which is herein incorporated by reference in its entirety.

Figure 2:
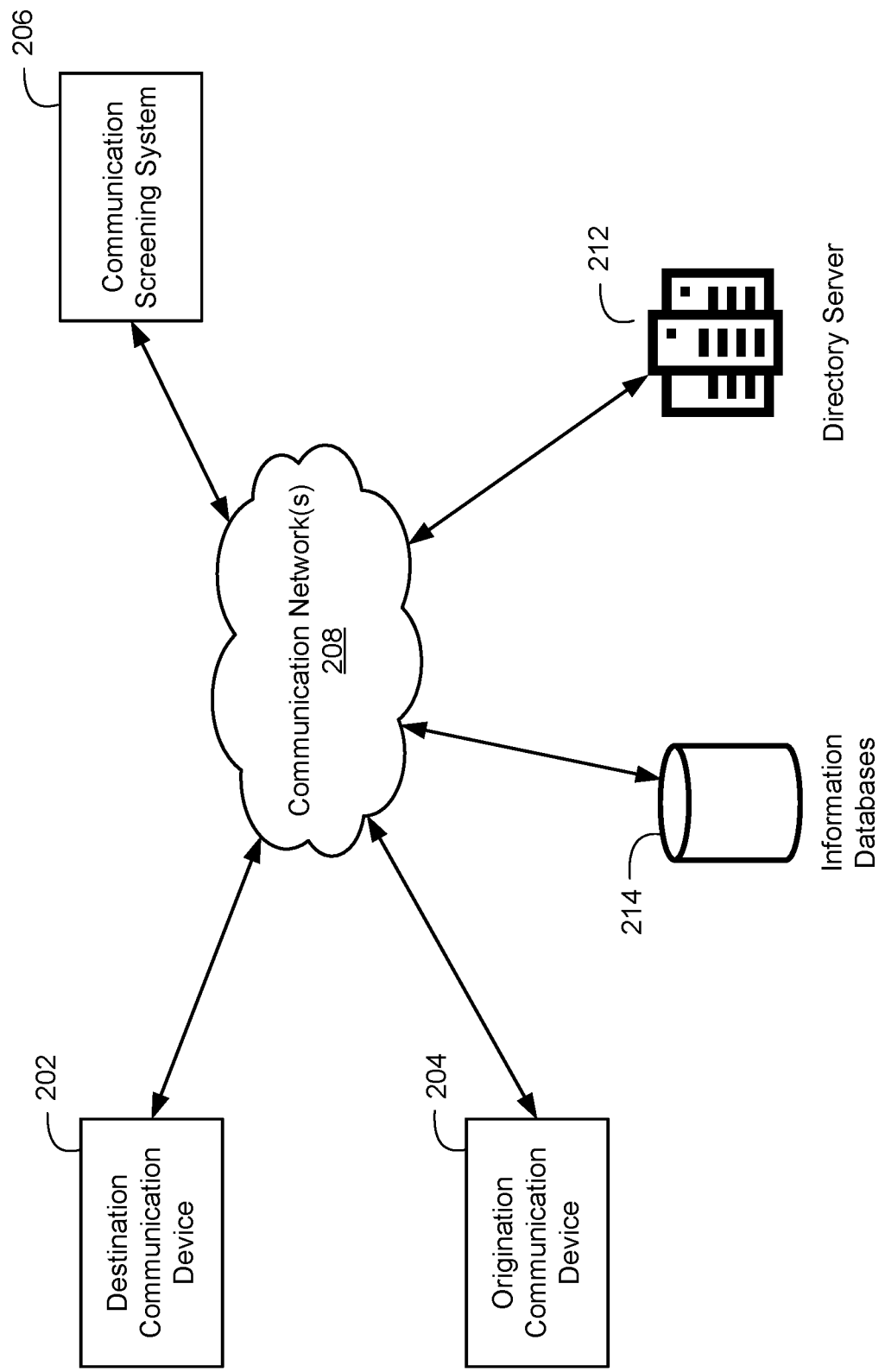
FIG. 2 illustrates another computing system according to an embodiment of the present invention.

FIG. 2 presents a system for screening communications between communication devices according to an embodiment of the present invention. The system includes a destination communication device 202 and an origination communication device 204 that are communicatively coupled by communication network(s) 208. Destination communication device 202 and origination communication device 204 may comprise any device or circuitry capable of receiving and/or sending voice or textual communications. Communication network(s) may comprise one or more telephone and data networks operable to transport telecommunications and message data. The origination communication device 204 may initiate a communication, such as a call, text message, or voice message, to destination communication device 202.

Communication screening system 206 may be configured to screen or filter communications that are directed to destination communication device 202. The communication screening system 206 may comprise a computing device including memory and processing devices, such as a server computer, or a service interface on a cloud computing platform, that is configurable by destination communication device 202 to monitor communications to destination communication device 202. A communication intended for the destination communication device 202 may be received from an origination communication device 204 and intercepted by communication screening system 206. Intercepting the communication may include prompting for a response (audio or textual) from the communicator of the origination communication device 204 or extracting data from the inbound communication to record a digital sample of the communication. The communication screening system 206 may also identify a phone number or identifier associated with the origination communication device 204. Communication screening system 206 may submit to and query directory server 212 with the sampled communication and the phone number or identifier. Communication screening system 206, directory server 212, and information databases 214 may exist in various embodiments as either separate systems, or collectively as components of a single system.

Directory server 212 may provide information results that can be used to determine whether the inbound communication is from an unwanted communicator or a wanted communicator. For example, the directory server 212 may include or is communicatively coupled to a database of fingerprints that are created from known recordings of calls or messages from unwanted or wanted communicators. The directory server 212 may compare the sampled communication from the origination communication device 204 with fingerprints in the database of fingerprints and/or provide a match analysis. Additionally, directory server 212 may calculate a score of a carrier or block of numbers belonging to that carrier servicing the phone number or identifier. The score may be calculated based on a monitoring of traffic, reported instances of positive or negative communication behaviors by the carrier or block of numbers, or other known attributes of that carrier (such as if that carrier enforces anti-spoofing measures in its communications).

The directory server 212 may return a result including fingerprint matches and a carrier or number block score for the origination communication device 204 based on the information provided by the communication screening system 206. Communication screening system 206 may determine whether the inbound communication is either from an unwanted communicator or a wanted communicator based on a combination of the fingerprint matches and the carrier or number block score. If the inbound communication is determined to be from an unwanted communicator, screening system 206 can take various measures, such as, suppressing any visual or auditory indications of the communication, performing a CAPTCHA test, blocking the origination communication device 204, playing a message that indicates unavailability, labeling of any recorded communication as potential spam (e.g., in a spam folder, or including a visual label), or ending a communication connection. Otherwise, if the inbound communication is not determined to be from an unwanted communicator, the call screening system 206 may allow the communication between the origination communication device 204 and the destination communication device 202. Communication screening system 206 may perform similar or identical functions as disclosed herewith with respect to call answering server 110.

Figure 3:
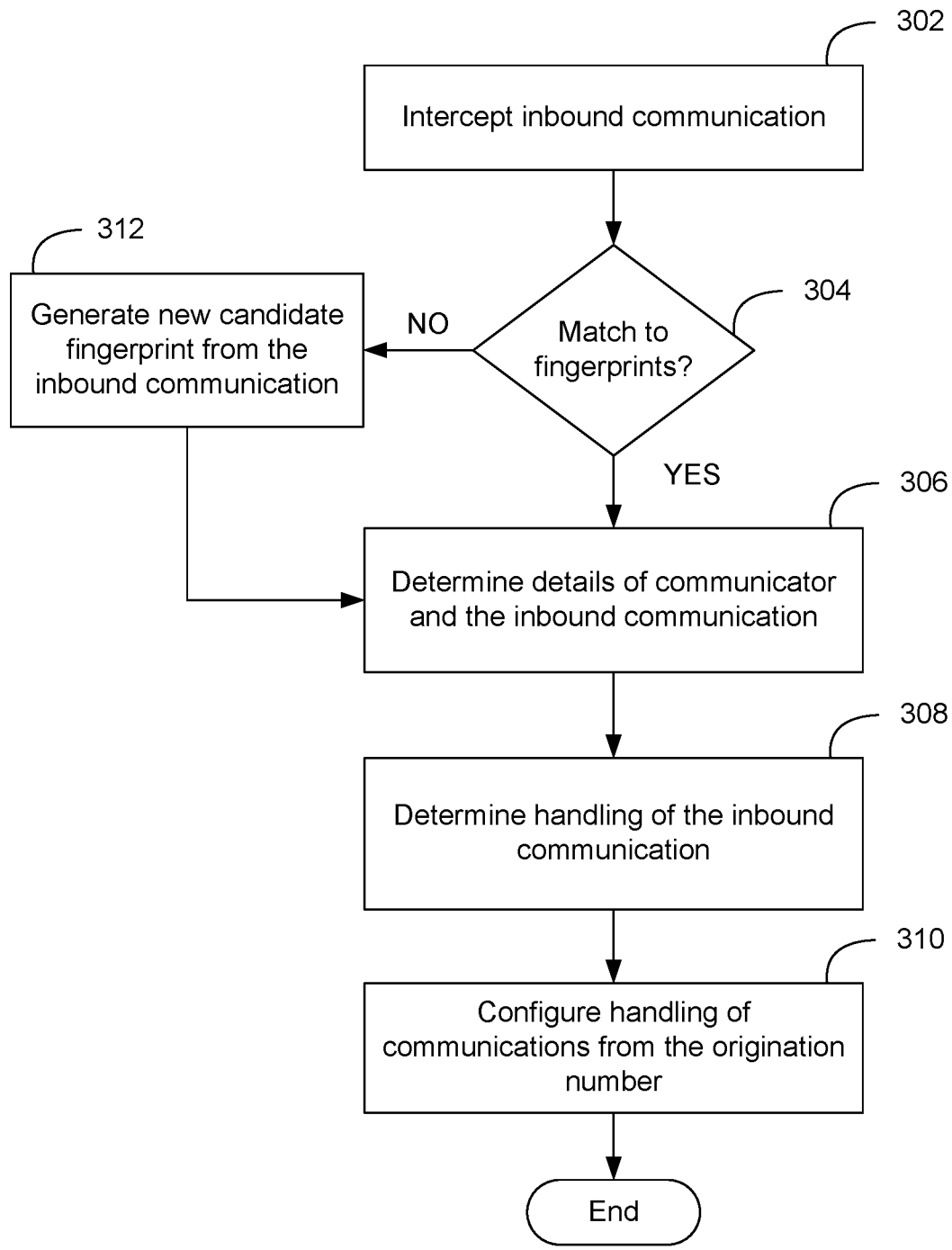
FIG. 3 illustrates a flowchart of a method for identifying unwanted communicators according to an embodiment of the present invention.

FIG. 3 presents a flowchart of a method for identifying unwanted communicators according to an embodiment of the present invention. An inbound communication is intercepted, step 302. The inbound communication may be a voice call, short message service (SMS) text, or voice message that is directed to an intended recipient from a communicator. The communicator may be either unwanted, wanted, or may have an unknown phone number, address, or otherwise unique ID. Inbound communications may be transcribed and turned into a form suitable for analysis and matching (e.g., text) using machine learning along with speech recognition and processing techniques. Exemplary methods and algorithms that may be used include Hidden Markov models, neural networks, deep learning, and end-to-end automatic speech recognition, to name a few. A suitable form may include a string of characters, or alternatively, a tag cloud.

The inbound communication is compared to fingerprints from a database, step 304. A digital sample of the inbound communication may be extracted and analyzed to determine whether the inbound communication is from an unwanted communicator or a wanted communicator. The database of fingerprints may be created from known recordings of calls or messages from unwanted or wanted communicators. The known recordings of calls or messages may be collected from a plurality of sources such as, voice message servers, call forwarding servers, telco and communication service carriers. The fingerprints may be used for comparison with inbound calls and messages to distinguish unwanted messages from wanted messages as well as identifying a likely identity associated with the communicator of the inbound communication. Identifying a likely identity may include determining a probability that a communicator is wanted or unwanted based on determined similarities between the inbound communication and the fingerprints. For example, the communicator of the inbound communication may be identified as an unwanted caller if the inbound communication is statistically similar (e.g., a 70% match) to one or more fingerprints associated with known unwanted callers. Alternatively, communicator of the inbound communication may be identified as an unwanted caller if a number of statistical matches between the inbound communication and fingerprints associated with known unwanted callers exceeds a particular threshold.

A given fingerprint may comprise features associated with a given message from a phone number of an unwanted communicator. The features may include a phone number, message duration, call frequency, time of call, call recipients, keywords, phrases, speech tone and other speech characteristics (such as, audio characteristics to help ensure matches—e.g., frequency range, whether it's male/female voice). Features of the given fingerprint may be compared to corresponding features extracted from the inbound communication. An aggregated score may be calculated based on a comparison of each feature. For example, certain features may be weighted more highly than others in calculating the aggregated score.

Each fingerprint can be associated with a tag based on whether its content indicates a problematic or safe communicator. An optional identifier including a descriptive or precise name may be associated with a communicator of the fingerprint (e.g., IRS Scam) to identify the communicator when calling. An algorithmic, rules-based approach may be used to determine whether or not a given fingerprint could indicate an unwanted call and what the likely name should be to identify the communicator. For example, the content of the data in the fingerprint may be analyzed, including phone numbers and keywords that appear in the fingerprint using rules such as, if a fingerprint contains a phone number, ID, or address known to be an unwanted communicator (as in the IRS Scam example above), the fingerprint can be tagged as unwanted and use the same name as other fingerprints also containing that phone number, ID, or address. An opposite rule may also be used if the fingerprint contains a known good number to call back, and it can be assumed to be a wanted call. Adding new fingerprints to a fingerprint database may include soliciting feedback from, for example, a human curator to review the information associated with the fingerprint.

The inbound communication may be compared against the known fingerprints of messages using methods and algorithms such as, logistic regression, decision trees, Bayesian network, and clustering to determine how much overlap there is between a given fingerprint and the inbound voice message, and to calculate a matching score. In one embodiment, the comparison can be based on computing longest matching sequences. In another embodiment, the comparison may be based on comparing tag clouds of the known recordings and the inbound communication, and finding a tag cloud from the known recordings with the "best fit." A match of inbound communications with the known fingerprints may be determined based on a score that reflects a degree of overlap between an inbound communication and a given fingerprint. A score that is equal to or exceeds a minimum score may indicate a match. The minimum score may be determined using techniques such as machine learning that is trained with a sample set of messages. Any of the above algorithms used in the comparison may also determine a highest matching score over a minimum acceptable score. Alternatively, a match of inbound communications with known fingerprints may be determined based on a score that reflects the degree of difference between an inbound communication and a given fingerprint.

If the inbound communication does not match any fingerprint, a new candidate fingerprint may be generated from the inbound communication, step 312. Otherwise, the system may proceed directly to determine details of the communicator and the inbound communication based on fingerprint, carrier and number block score, or other attributes, step 306. The system may identify the origination number is associated with a telecommunications carrier. A carrier score may comprise a score for the carrier of the origination number that indicates the likelihood of traffic from the carrier being unwanted. Likewise, a number block score may comprise a score for a block of numbers that indicates the likelihood of traffic from the block of numbers being unwanted. The carrier and number block scores may be determined by referencing a data source of unwanted call statistics associated with the carrier or number block or calculated based on a percentage of suspect traffic or robocalls associated with the carrier or number block by means of communications monitoring. The score may also be calculated based on reported instances of positive or negative communication behaviors by the carrier or block of numbers, or other known attributes of that carrier (such as if that carrier enforces anti-spoofing measures in its communications). Fingerprint, carrier and number block score, and other attributes may be factored with given weightings for determining actions in a next step. For example, a call that is determined to be borderline associated with a VoIP wholesaler may be considered as spam while a call on a carrier with anti-spoofing measures may be considered good or rated favorably.

Appropriate handling of the inbound communication is determined based on a match to any of the fingerprints and/or the carrier and number block scores, step 308. Determining appropriate handling may rely on identification of the communicator as wanted or unwanted based on matching (either a degree of overlap or differences) of the inbound communication to any of the fingerprints, and classifying the communicator as either an unwanted communicator if the inbound communication matches (to a certain degree) one or more fingerprints associated with unwanted communicators, or a wanted communicator if the inbound communication matches (to a certain degree) one or more fingerprints associated with wanted communicators. The carrier or number block scoring may supplement the fingerprint matching, either confirming or intervening. Alternatively, if the carrier or number block scoring exceeds given thresholds, either as an absolute number, e.g., 50% or in comparison to other carriers, indicating a good or bad or suspicious carrier or number block, the communicator may be inferred to be likely as wanted or unwanted communicator, depending on if the carrier or number block scoring indicates such.

Handling of calls from the communicator is configured, step 310. Users may be provided with the option to screen, forward to voicemail, test (e.g., audio CAPTCHA), block, or automatically reject and dispose of future communications from unwanted communicators should their telephone or application-enabled device receive a call or message from an unsolicited communicator. For example, if the communicator of the inbound communication is determined to be an unwanted communicator (from step 308), suppression of audio or visual call indication, CAPTCHA testing, spam labeling, call blocking and out-of-service operations may be configured for the phone number, address, or unique ID associated with the inbound communication.

Out-of-service operations may include playing a sequence of tones to the communicator followed by a "disconnected message" that emulates the behavior of a phone number that is not in service. Alternatively, unwanted communicators may be added to a black list where future calls or messages from phone numbers, addresses, or unique IDs from unwanted communicators are blocked. Additionally, users can configure their devices to not ring or display the inbound communication when they are determined to be unwanted, thus effectively eliminating any personal distraction that may have otherwise experienced upon receiving a call from an unwanted communicator. Users can also configure the communications from unwanted communicators to be labeled as such, as in the case of voice messages, organized in a spam folder or annotated with a spam label. Calls from phone numbers, addresses, or unique IDs of wanted communicators may be configured (e.g., placed on a white list) for unimpeded calling to a user's device or normal voice mail operations that allows a communicator to leave a message and access normal answering service operations. This allows unwanted communicators to be blocked in the future, and desired communicators to always get through successfully.

The phone number, address, or unique ID of the communicator may also be identified for future calls (such as in a call log that identifies blocked calls) to other recipients as well as the intended recipient of the inbound communication. That is, a match of an inbound communication to a type of fingerprint (unwanted vs. wanted) and/or carrier and number block score may be used to play an appropriate message (such as an out of service message for unwanted communicators) to communicators from the phone number, address, or unique ID, and an identifier (e.g., IRS Scam) may be used to provide an appropriate communicator ID (such as "IRS Scam"), which can be displayed in call logs and other places, even when the call has been blocked.

Figure 4:
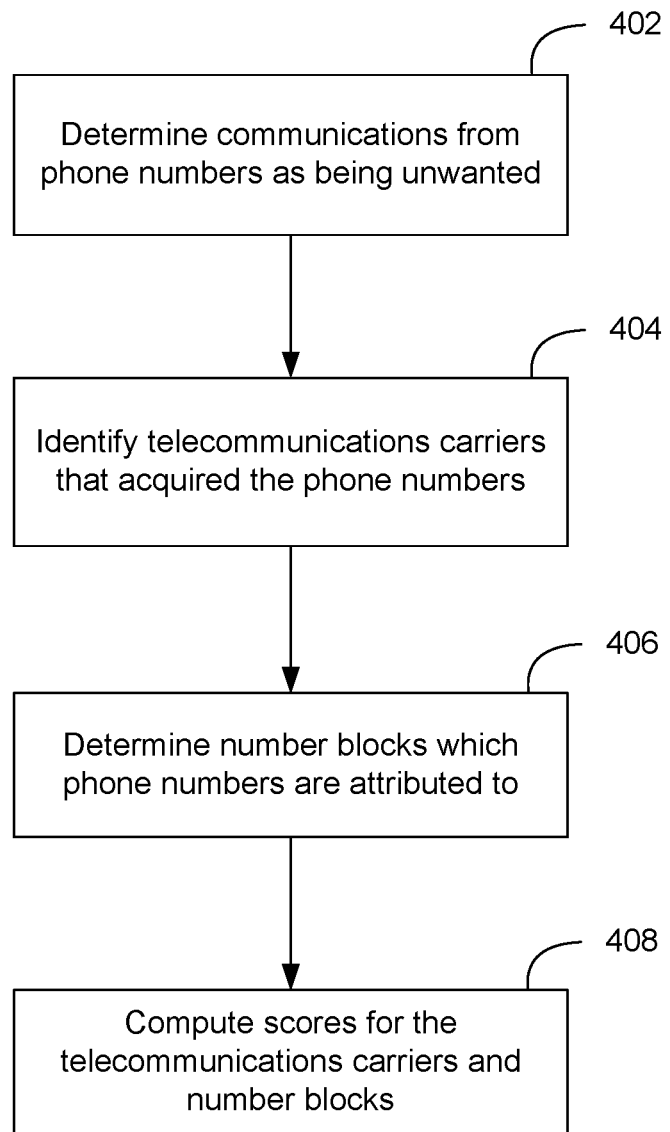
FIG. 4 illustrates a flowchart of a method for scoring telecommunications carriers or number blocks according to an embodiment of the present invention.

FIG. 4 presents a flowchart of a method for scoring telecommunications carriers or number blocks according to an embodiment of the present invention. A system may determine communications from one or more phone numbers as being unwanted, step 402. Determining the communications as being unwanted may include analyzing communication content features (or fingerprints) of communications associated with unwanted communicators and comparing them with the communications from the phone numbers.

Telecommunications carriers that acquired the phone numbers are identified, step 404. For example, the phone numbers may have been acquired by telecommunications carriers who sold or distributed the phone numbers to customers. Number blocks are determined for which the phone numbers are attributed to, step 406. The containing number blocks for the phone numbers are determined. For example, the phone numbers may be determined to belong to a series or a range of numbers in blocks of 10, 100, 1000, etc.

Scores for the telecommunications carriers and the number blocks are computed, step 408. The scores for the telecommunications carriers and number blocks may be computed based on an amount of the determined unwanted communications from the phone numbers. These scores may also be updated over time by performing continuous monitoring of certain phone numbers. As discussed herein, certain ones of telecommunication carriers may cater to robocaller customers. As such, an amount or percentage of unwanted communication traffic from phone numbers acquired by the telecommunication carriers may be tracked and used to compute scores for the telecommunication carriers and number blocks. The system may continuously monitor communications from phone numbers and adjust telecommunication carrier and number block scores accordingly such that a carrier or number block's status can change dynamically. The scores computed for the telecommunications carriers or number blocks may be used to screen calls.

Figure 5:
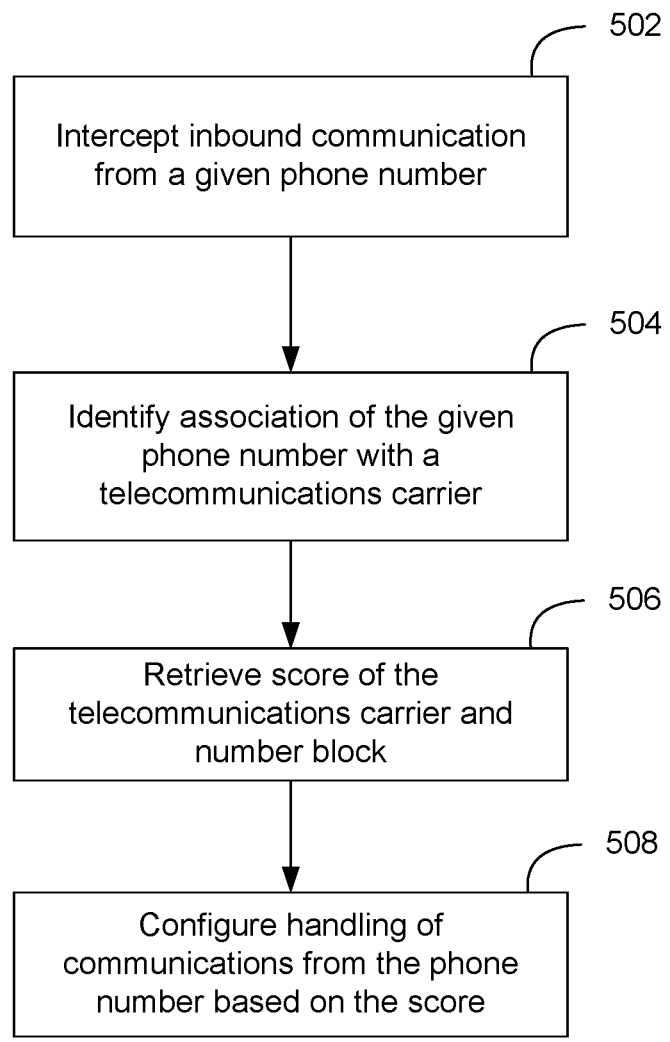
FIG. 5 illustrates a flowchart of a method for screening calls according to an embodiment of the present invention.

FIG. 5 illustrates a flowchart of a method for screening calls according to an embodiment of the present invention. A communication screening system may intercept an inbound communication from a given phone number, step 502. The inbound communication may be a voice call, short message service (SMS) text, or voice message that is directed to an intended recipient from a communicator using the given phone number. An association of the given phone number with a telecommunications carrier is identified, step 504. The association may include the telecommunications carrier being an acquirer of the given phone number.

The containing number block for a phone number is determined. For example, number blocks may be organized in blocks of 10, 100, 1000 or any size. As the owning carrier of a number is determined per step 504, the range belonging to that carrier may also be determined as well as any downstream assignment. In some cases, the carrier for a number may not be able to be determined but the number block is still relevant. For example, the phone number 000-500-1001 does not belong to a U.S. telecommunications carrier but as a number block may be used by an unwanted spam caller who in turn uses all numbers 000-500-1000 through 000-500-1999 in a given afternoon to place unwanted calls. As the first call in a given 1000 number block range is received and categorized, subsequent communications from other numbers within that block with a given time period may affect the scoring of that number block, whereby it may only take a few calls before that entire range is considered suspect and subjected to restrictions on how incoming communications from that number block are handled.

A score of the telecommunications carrier and number block are retrieved, step 506. The score may include an indication or frequency of unwanted communication traffic being associated with numbers that were acquired by the telecommunications carrier or belong to that number block. Handling of communications from the phone number is configured based on the score, step 508. The handling of communications from phone numbers associated with certain telecommunications carriers may vary. For example, certain scores may cause the communication screening system to prompt an audio challenge. Other scores may cause the communication screening system to forward communications to voice mail and label any recorded communication as potential spam. While a high score (e.g., high volume of unwanted traffic from the carrier) may cause the communication screening system to block communications or suppress auditory and/or visual indication of an incoming communication.

Figure 6:
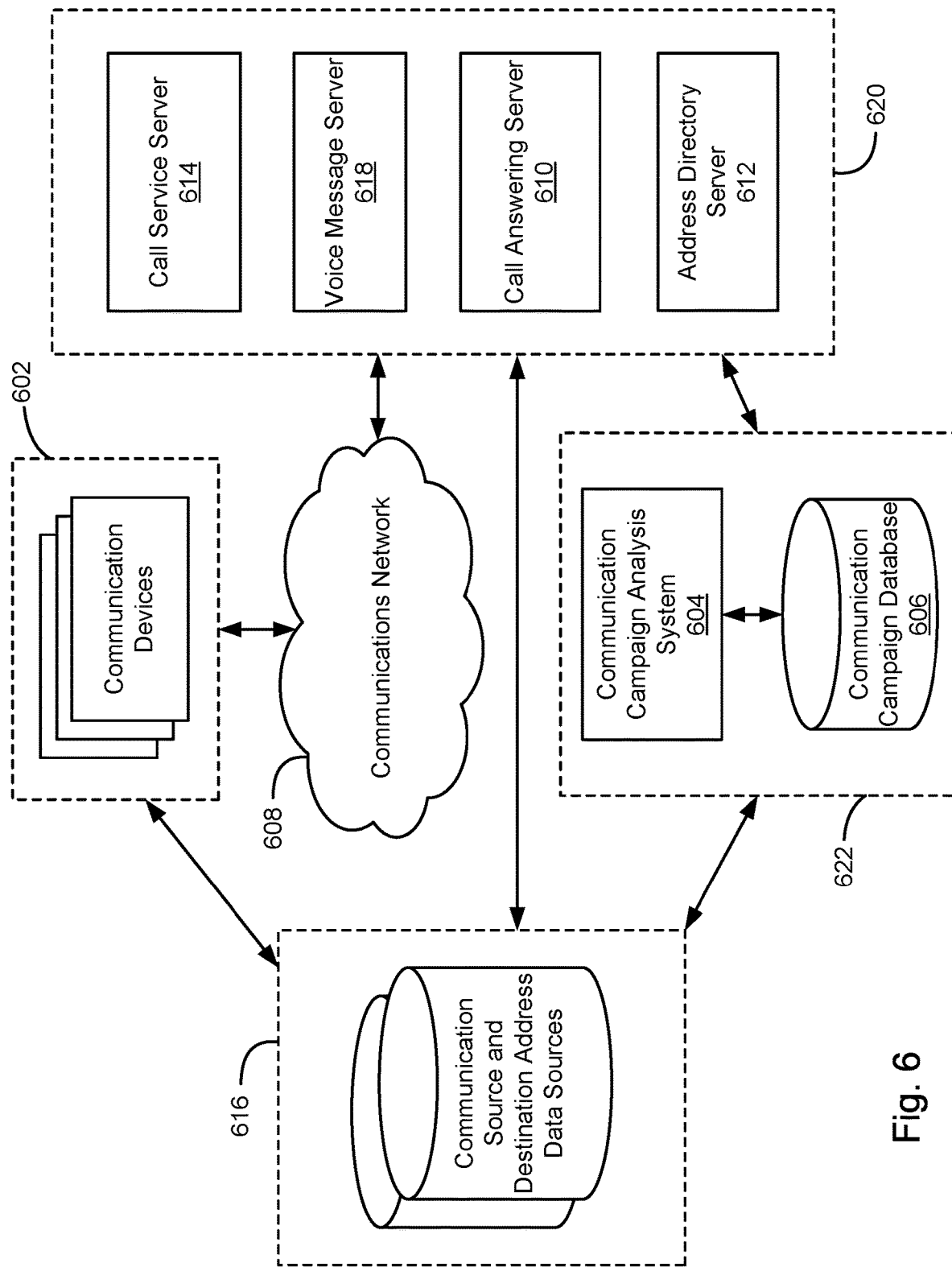
FIG. 6 illustrates a computing system according to another embodiment of the present invention.

The system presented in FIG. 6 includes communication devices 602, such as telephones (e.g., landline, cellular, analog, digital, satellite, or radio), smartphones, and WiFi-enabled or application-enabled devices (e.g., personal computers, television set top boxes, laptops, personal digital assistants (PDA), tablet computers, e-book readers, smart-watches and smart wearable devices, or any computing device having a central processing unit and memory unit) that are capable of establishing and receiving audio or video communications via a communications network 608 (e.g., using Voice over Internet Protocol "VoIP", H.323/SIP, etc). In some embodiments, the communication devices 602 are enabled with a native call application, such as one provided by a wireless carrier, or an over-the-top (OTT) application such as the "YouMail" application made and distributed by YouMail Inc., www.youmail.com, the assignee of the present patent application. As presented in the figure, the communication devices 602 may also represent the originating system of an unwanted communication as it participates in the communications network 608 with a destination to be received by another communication device.

According to one embodiment, the communications network 608 may include the Internet, a private VPN (virtual private network), or any other communications network e.g., any local area network (LAN) or wide area network (WAN) connection, cellular network, wire-line type connections, wireless type connections, or any combination thereof. Communications network 608 may be any suitable type of network allowing transport of data communications across thereof. The communications network 608 may couple devices so that communications may be exchanged, such as between servers and communication devices or other types of devices, including between wireless devices coupled via a wireless network, for example. The communications network 608 may also include mass storage, such as network attached storage (NAS), a storage area network (SAN), cloud computing and storage, or other forms of computer or machine readable media, for example.

The system further comprises a database of communications 606 and an analysis system of those communications 604. The source data for these unwanted communications may be assembled via many sources as depicted in the diagram. One such source of data may be other separate databases of communications or communications addresses 616, or an individual or aggregate set of systems 620 that in turn contain call servicing servers 614, voice messaging servers 618, call answering servers 610 or communication address directory servers 612. The data available from the communication source and destination address sources 616 may relate to either an independently collected source of information about addresses such as phone numbers, or could represent the actual call records (CDRs) that a communications service provider maintains for calls that originate or are transported via their networks. The servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. In an example embodiment, a server may include or have access to memory for storing instructions or applications for the performance of various functions and a corresponding processor for executing stored instructions or applications. For example, the memory may store an instance of the server configured to operate in accordance with the disclosed embodiments.

Communication devices 602 may receive an incoming communications while interfacing with the call service server 614. The call service server 614 may provide additional information about the caller that would be helpful to the communication devices 602. This data may be available at the time of the communication, or may have been retrieved by the communication devices 602 ahead of a communication and generally relate to the addresses from which communications could originate (e.g., a phone number). As an example, the additional information made available to a communication device 602 from a call service server may include details about a general or specific communication instance, such as the purpose of a specific call or an offer made by the calling party. By appending this information to a caller identification field, it may be displayed to the recipients on their communication devices 602 in the caller ID field, and the recipients may be provided with more options to respond to the incoming communication. The communication devices 602 may display and provide users with various options and messages based on screening by the call service server 614, for example, to configure rules, accept and waive fees, select payments options, and view and accept offers.

Call service server 614 is able to accumulate phone numbers (or addresses, or unique IDs) and information about the phone numbers from a variety of sources that can be used to determine if a given phone number is that of e.g., an unwanted communicator, or a wanted communicator. One such source are the communication devices 602, which may send a list or log of calls made and received, recordings or transcriptions of phone call conversations (e.g., voicemail transcription systems, such as, one provided by the application from YouMail as mentioned above), text messages, and a list of contacts including phone numbers and associated IDs to the call service server 614 over the communications network 608. While not required for a call service server to provide information to a communication device, other sources may be used to add additional insight into a communication that include a call answering server 610 and voice message server 618. Call answering server 610 and voice message server 618 may perform additional valuable functions such as recording (and/or transcribing) voice messages for the users of communication devices 602. The information on current or past communications can better assist the user of a communication device 602 in the dispositioning of a live incoming communication as they are made aware of prior communications left by that party.

The call answering server 610 may be used to screen incoming communications made by one party to another, e.g., a call placed from a caller to a recipient. Communications network 608 can relay or forward incoming communications to the call answering server 610 to determine whether the incoming communications are allowed. Call answering server 610 can receive and filter the incoming communications from callers based on user-created rules stored in a user rules database. In an alternative embodiment, the rules can be stored on a user's communication device 602 and the call answering server 610 can use a copy of or access the rules when a call is received. The call answering server 610 can be instructed, based on stored user rules associated with the recipient to either, allow the caller to be routed to the recipient's device, dropped or provided an alternative behavior to that of being allowed to leave a voicemail or the typical behavior with the call answering service for a wanted call. Unwanted callers received by communications network 608, such as spammers or robocallers, can be filtered, or connected if the recipient is provided consideration and accepts the consideration, such as a small fee or a discount for goods or services being offered by the caller. The call answering server 610 may optionally present challenges (e.g., an audio CAPTCHA) to callers. Details of call screening by call answering server 610 can be made available to or sent to the communication device 602 or call service server 614 so the user can be made aware of the dispositioning of that communication.

The address directory server 612 may include or access data from communication source and destination address data sources 616, such as, public telephone listings and directories, electronic yellow pages, private or proprietary communication networks, and the like. The address directory server 612 may search these address data sources 616 for information about certain originating addresses including information about their originating communications service provider, the actual name or organization of the address's owner, physical mailing addresses, etc. The data could be retrieved through an application programming interface ("API") call or the data could be retrieved in batch and stored locally to the address directory server 612. Other sources of information for providing additional information about addresses such as phone numbers for the include cell phone billing records, telephone and cable service provider records such as CDRs (call detail records), and the like. Once the data is represented or accessible by the address directory server 612, other servers like the call service server 614, voice message server 618 and call answering server 610 can provide variable behavior to a communication based on this data (e.g., blocking an inbound communication because the accumulated data indicates the communication is likely to be unwanted vs wanted).

In at least one embodiment, the communication campaign analysis system 614 may create one or more "fingerprints" or digital signatures of known recordings of communications (voice and/or text calls or messages) from unwanted or wanted communicators by using speech processing, natural language processing, and machine learning algorithms with the information accumulated from the variety of sources. Each fingerprint may be used to identify a sequence of characters, audio or video speech such as a spectrogram or hash designed to capture the content of, for example, a commonly appearing or known audio phrase or message. Fingerprints may be substantially unique or unique enough to satisfy a desired statistical probability of the fingerprints being the same or different from each other. In another embodiment, a fingerprint may comprise a tag cloud, or alternatively, a weighted list, that includes each keyword that appears in the message and the number of times each keyword appears in the message that is used to summarize the content. A tag cloud (also known as, a word cloud or a text cloud) may comprise a representation of text content data from the communications including keywords or tags, and an emphasis of importance of each keyword or tag that may be indicated with a variety of indicators, such as, ranking, arrangement, classification, word count, font size and color. In another embodiment, machine learning algorithms (e.g., k-means clustering, mean-shift clustering, DBSCAN ("density-based spatial clustering of applications with noise"), agglomerative hierarchical clustering) can help cluster fingerprints into campaigns for further analysis and understanding. Further description and details of fingerprinting are described in further detail in commonly owned U.S. Pat. No. 10,051,121, entitled "SYSTEM AND METHOD FOR IDENTIFYING UNWANTED COMMUNICATIONS USING COMMUNICATION FINGERPRINTING" and U.S. Pat. No. 9,591,131, entitled "SYSTEM AND METHOD FOR IDENTIFYING UNWANTED CALLERS AND REJECTING OR OTHERWISE DISPOSING OF CALLS FROM SAME" which are herein incorporated by reference in its entirety.

The address directory server 612 may receive or retrieve addresses such as phone number and information about the addresses from the call service server 614. For each phone number, indications of likelihood that the phone number is that of an unwanted communicator may be provided by call service server 614 to the address directory server 612. Address directory server 612 may include logic that determines the likelihood that a particular number is that of an unwanted communicator based on the information about the phone numbers from call service server 614. For example, the indication of likelihood may be represented by a binary flag indicating whether or not the number has been determined as exceeding a threshold value set as likely to be that of an unwanted communicator. Alternatively, the likelihood may be represented with a score value computed as the likelihood of representing an unwanted communicator based on a set of quantitative rules. In another embodiment, an indication may be retrieved from the call service server 614 that explicitly identifies a phone number as an unwanted communicator (or categorized otherwise). Address directory server 612 may also match inbound calls or messages with the known fingerprints from call service server 614 to calculate a score that reflects a degree of overlap between the inbound calls or messages and one or more fingerprints.

The address directory server 612 may monitor carrier traffic (e.g., reported by users, by analyzing communication content features (or fingerprints) being associated with either wanted or unwanted communicators, and/or by identifying likelihood of a wanted or unwanted communicator). Some carriers may sell numbers to other entities, and chains of custody may be tracked to determine which carrier is attributed to the activities of the numbers. In other cases, a current traffic from blocks of numbers that belong to a carrier may be identified as a block rather than a carrier. For example, a spammer may obtain a block of 100 numbers from a given carrier and begin a pattern of sequentially using those numbers to place unwanted calls. This block of 100 numbers could be cataloged in a manner that weighs that block as unwanted rather than the entire carrier.

According to one embodiment, communication campaign analysis system 604 may collect evidence of unwanted or fraudulent calls to call recipients or users through communication fingerprinting. Evidence collected from samples of these communications can be used to determine the originating communications service provider through a number of techniques where each technique may indicate a different communications service provider for that single communication. For example, the originating address (e.g., phone number) presented may be able to be quickly looked up via the appropriate organizing body for those addresses (e.g., a toll free number's RespOrg can be determined by consulting the TFN (toll-free number) data from a service such as RouteLink). However, many times unwanted communications may spoof the originating number and instead a traceback may be necessary to find the originating communications service provider. In this case, the communication campaign analysis system 604 could use samples collected in the communication campaign database 606 to match with those specific instances of communications and perform traceback to the real originating communications service provider (or the nearest cooperating communications service provider that carried that communication to the destination).

Finally, the communication may include one or multiple reply-to addresses (e.g., call back phone numbers, website addresses/URLs) which the recipient could use to communicate back with the originating party. Regardless of the method of determining possible originating communications service providers, one or all of the potential communications service providers can be notified that there was an unwanted communication that had a relationship to their service and once made aware of the unwanted communication, the communications service provider can decide how to handle the account that originated that traffic and potentially shut that account down. Collecting evidence of unwanted or fraudulent communications may include grouping related communications (e.g., through fingerprinting described above) into communication campaigns comprising instances of a same likely unwanted campaign but may include different calls/messages/communications that are received at communication devices, e.g., because they're cut off, transcribed differently, have used different proper nouns or verbiages, etc. Fingerprints may be determined to be related based on similarities in content, genre, or phrases. For example, "Student Loan Corona Pandemic Refund" might be a campaign that aggregates variants of a campaign leaving messages that people can have their student loan payments covered during a pandemic period (which, for example, would be a scam).

For each instance of an individual communication (e.g., phone call, SMS message, conference joining) that matches a communication campaign, the communication campaign analysis system 604 may report the instance and its corresponding data to one or more communications service providers whereby their relationship to the communication is identified using the techniques described above. Communication campaign analysis system 604 may report one or more of these specific individual communications that match known campaigns by transmitting call data to a separate system that manages a communication traceback process. For example, an instance of a communication campaign that called a communication device (at 310-555-2222) on carrier ABC from a 310-555-8888 which is believed to have originated at carrier XYZ number at 8:45 am and leaves an audio message which was fingerprinted, matched to a communication campaign and classified as a scam. The communication campaign analysis system 604 may make this data available to the carrier XYZ as signaling the account holder of phone number 310-555-222 is misbehaving and ask where the communications service provider if they originated the call. Carrier XYZ may then check their local database of communications (e.g., a call detail record database for phone calls) and determine that the call did in fact originate from their service, or instead originated from another communications service provider. In the case where carrier ABC determines they originated the communication, no traceback is required as the data indicates that carrier ABC originated the call. In another embodiment, carrier ABC does not find evidence that they originated the call, but instead carrier ABC can employ a traceback where they need to determine from their records the carrier that passed them the call and work their way up the chain of communications service providers who to determine the true originating carrier behind the call.

A traceback process may comprise traversing through all the hops (e.g., communications service providers/carriers) of a given communication to arrive at the source, which requires participation of all the in-between communications service providers. As such, a traceback that traverses through all the in-between communications service providers may be a lengthy process. Often these require the effort of a human being who will search through log files, which for a busy communications service provider may not be retained for more than a few hours or days. Sometimes in-between communications service providers may not cooperate in participating in a traceback for other reasons (e.g., they don't maintain the data, the data is not easily accessible, or the human resources to look up a communication may not be available, etc). Moreover, the originating communications service provider may only be made aware of a limited amount of unwanted communications that happen on their network as the result of the traceback process. That is, only instances that are reported to or traced to the communications service provider are ones they are aware of and can take action upon. Without any signals that an account at the communications service provider is acting badly, there would be no impetus to take action on a badly behaving account since no signs it is behaving badly are otherwise evident.

According to one embodiment, communication campaigns and communication data (e.g., a recipient address, an originating address, a time of communication, and a communications service provider facilitating the communication) corresponding to instances of the communication campaigns may be compiled in a communication campaign database 606 by a communication campaign analysis system 604. The data corresponding to the instances of the communication campaigns may be transmitted by the communication campaign analysis system 604 (e.g., periodically, real-time as communications match known bad campaigns) to a group of communications service providers to quickly identify the actual actors perpetuating scams via those communications. In one embodiment, the data may be broadcasted to a plurality of cooperating communications service providers (e.g., by email or API integration points into their respective systems) simultaneously, to expedite the process of identifying the true originating accounts and effecting a shut down of those accounts. Communication data corresponding to the instances of the communication campaigns may be transmitted to or made available for access 622 by communications service providers in a variety of data transmission methods or formats. The transmission may include an email, data file, or any other type of message or data format. For example, a notification including an e-mail may be sent to a fraud department email address of a communications carrier that performs a lookup in their call databases for a call in question. In another example, carriers may participate in an online portal or dashboard, or download (e.g., via a pull mechanism to hold up a mirror to their outgoing traffic) the data from the communication campaign analysis system 604 or communication campaign database 606 where the communication data includes instances of the communication campaigns.

One challenge is that a majority of lookups are performed by communications service providers that don't find instances of the communications for the given communication campaigns on their networks, e.g., because they originated elsewhere. To optimize the broadcasting of the communication data corresponding to instances of the communication campaigns, a communications service provider who "owns the number" may be solicited to confirm whether the given communications (indicated by the communication data) associated with the originating address (e.g., source phone number) originated from their service. As such, communication campaign analysis system 604 may perform a lookup for an originating address (e.g., phone number) matching an instance of a communication campaign via, for example, an address directory server 612, for information about the originating phone number including information about its responsible communications service provider. As described above, the address directory server 612 can use a composite view of many other data sources in order to determine this answer. If the communication can be confirmed by the communications service provider as originating from their service, the communications service provider can shut it down and further investigation by other communications service providers coordinated by the communication campaign analysis system 604 may not be necessary. If the communications service provider didn't find the call, the communications service provider may determine it was likely spoofed and originated from another communications service provider. That is, a communications service provider who looks at whether any instances of communication campaigns originated on their network might discover that they didn't originate on their network, which can optimize the process of determining the true originating communications service provider as the communications service provider who performed this investigation can rule out whether not only if they were the originator, but also if they were an intermediary.

According to another embodiment, a communications service provider may receive additional communication instances from a set of communication instances of a given communication campaign based on a feedback including a matching of an instance of the given communication campaign to communications on the communications service provider's service. This is due in part in many cases that a given communication campaign may not be enacted from just a single originating address or account at that communications service provider, but in fact from several accounts that would ordinarily appear unrelated. In many cases, there is a fair probability that if one account is participating in a communications campaign, other accounts may be participating in at as well in order to evade standard techniques of monitoring accounts for suspicious, high outbound communication volumes. For example, communication campaign analysis system 604 may send a communications service provider an instance of a communication including a communication log entry, "telephone number 1 called telephone number 2 at 10:43 pm for 20 seconds" and when that is matched, other communications of the same type of incident can be made available so that all accounts and addresses contributing to communications for that campaign can be identified and remediated.

In certain embodiments, communications service providers may directly enable their communication databases to participate in the analysis of campaigns. The communications service providers may make an API available for access 622 by the communication campaign analysis system 604 to inspect calls more directly. Instead of transmitting call data of instances of communication campaigns to the communications service providers, communication campaign analysis system 604 may directly query the call databases for matching with the call data. For example, a call log entry at a communications service provider may be mapped to an instance of an unwanted communication in the communication campaign database 606. Thus, communications service providers may allow the communication campaign analysis system 604 to query their communication databases to ask if they had a particular call such that the task of identifying unwanted activity does not fall on the communications service provider In another embodiment, the communications service provider may instead choose to upload or transmit their communication records to the communication campaign analysis system 604 for analysis to take place on a full or partial set of communication records to consider them for matching purposes to data managed by the communication campaign analysis system 604. As more communications service providers look to manage and analyze their data "in the cloud," this embodiment represents the transmission of the underlying communication data for this type of analysis in that manner.

As such, traceback and determination of originating communications service providers associated with instances of communications for given communication campaigns may be used to score communications service providers and handle communications carried by such communications service providers accordingly based on the score. For example, communications may be configured with the option to screen, forward to voicemail, test (e.g., audio CAPTCHA), block, or automatically reject and dispose of future communications from unwanted communicators should their telephone or application-enabled device receive a call or message that is carried by a given communications service provider. The system may continuously monitor communications from phone numbers or addresses and adjust telecommunication carrier scores accordingly such that a carrier or number block's status can change dynamically. Scoring may be improved through tracebacks and by learning that communication campaigns appearing to come from a given communications service provider or carrier are actually coming from another communications service provider or carrier.

Figure 7:
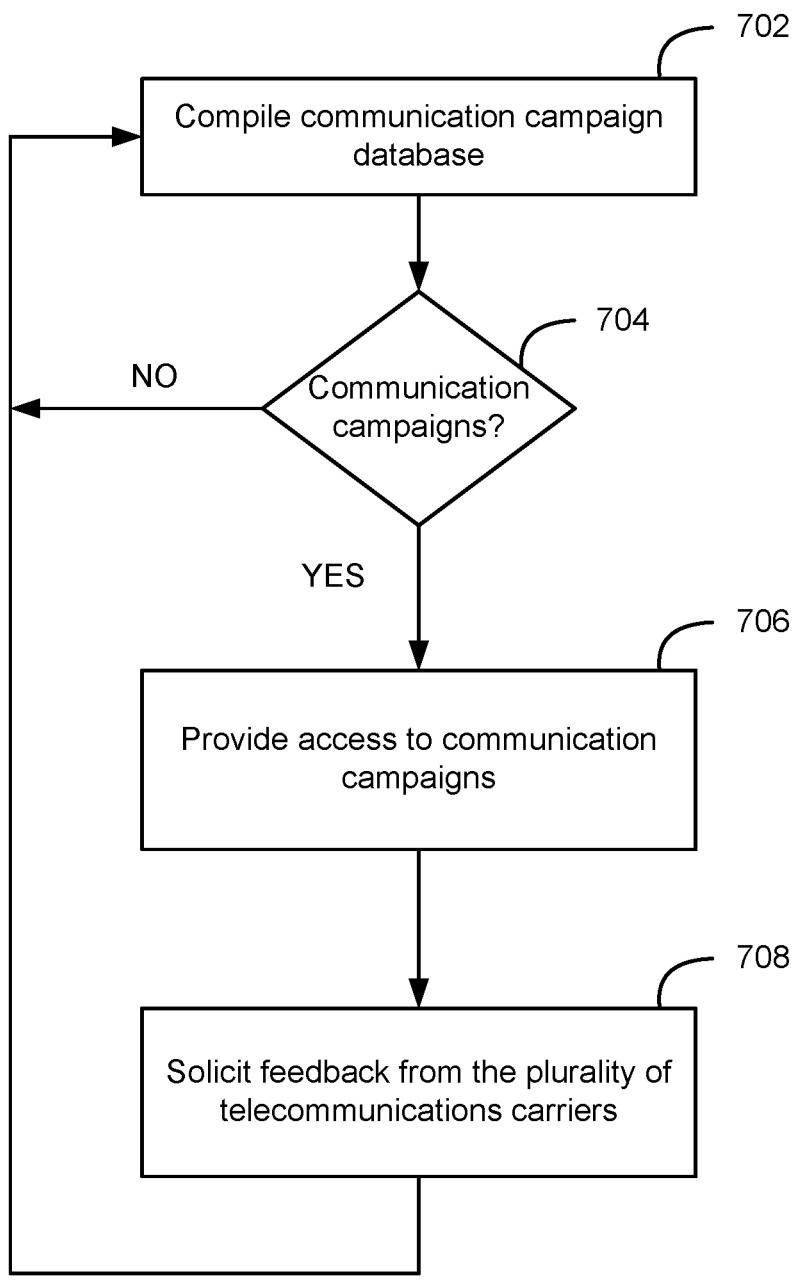
FIG. 7 illustrates a flowchart of a method for determining unwanted call origination according to an embodiment of the present invention.

FIG. 7 presents a flowchart of a method for determining unwanted call origination according to an embodiment of the present invention. A communication campaign database that stores communication data samples compiles those samples into one or more communication campaigns, step 702, that can be organized in many different manners—based on time, intent, keyword, etc. A given communication campaign may include a grouping of related fingerprints that identify a sequence of characters or audio speech associated with communication instances of a same communication campaign. Calls or communications including characteristics that match the fingerprints of a given communication campaign may be identified as an instance of a given communication campaign. Call data including a recipient address, an originating address, a time of communication, and a communications service provider indicated in the communication (as the originator, mentioned in the content of the communication as a response address, e.g., call back number) may be determined for instances of the communication campaigns.

As communications are identified as belonging to a communication campaign of particular interest (e.g., fraudulent, scams, harassment, etc), step 704, the behavior of the overall campaign as well as individual instances of communications within those campaigns can be made accessible to any communications service provider, step 706, that could be a participant in originating, implicated as originating, utilized as a response service provider, or implicated as a response service provider to those communications. Generally, the intent is to identify where the originator of an unwanted communication campaign is operating and to shut down their access and prevent further such communications. A collaboration of communications service providers may be accomplished via a broadcast to a plurality of communications service providers in parallel or through regular interfacing of those communications service providers with a system where the data is available as an alternative to the broadcast.

Alternatively, the method may optimize the simultaneous participation of communications service providers by instead prioritizing the participation of communications service providers that are most likely to be the primary party that can take action on a campaign (e.g., the communications service provider who "owns a phone number" associated with given call instances) and query whether the communication activities (e.g., indicated by the call logs on their systems) indicate the communication actor is operating from their service. The method may then proceed to solicit the participation of other communications service providers if it was determined the participation of the primary service provider was insufficient to determine the origin of the actor of the communications.

Feedback from communications service providers carriers is solicited, step 708. The communications service providers utilize communication instances for communication campaigns to find and match communication data records from their service (e.g., do they have a call to 310-555-2222 from a number 310-555-8888 at 8:45 am that lasted about 44 seconds). If a communication record matches, then an instance or presence of a communication campaign may be detected on the communications service provider's service. There may be a small probability that a legal communication matches a communication instance at the same time, but it's vanishingly small, and decreases during analysis of a broader campaign comprised of multiple communication instances. By checking a whole list of communication instances, a communications service provider can quickly detect all instances of unwanted activity originating on their network at the given period of time. By doing this at consistent intervals, the communications service provider can minimize the amount of unwanted activity that operates on their service. Both indication of matches or absence of matches to records at the communications service provider may be contributed back as feedback. In the case of matches, additional data indicating whether the communications service provider was an originator or intermediary can be contributed. By performing the aforementioned steps for multiple communications service providers, the system may essentially broadcast unwanted communications traffic, asking every communications service provider to see if it is operating at their service, such that they can shut it off.

In one embodiment, additional communications service providers to solicit for participation in identifying and remediating a communication campaign may be determined based on the feedback (e.g., as reported by a worker at an intermediary communications service provider). Improved unwanted communication remediation may be achieved with greater amounts of communications service provider participation. The method proceeds back to step 702 to compile additional one or more communication campaigns, and instances thereof, likely to be unwanted/fraudulent into the communication campaign database for a next given time period.

FIGS. 1 through 7 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method, in a data processing system comprising a processor and a memory, for determining unwanted call origination, the method comprising:
   compiling a communication campaign database storing data of one or more unwanted communication campaigns, the one or more unwanted communication campaigns including a grouping of related fingerprints that identify a sequence of characters, audio or video speech associated with instances of a same likely unwanted communication campaign;
   identifying an individual communication as an instance of a given one of the one or more unwanted communication campaigns by matching a fingerprint of the individual communication to the given unwanted communication campaign; and
   transmitting call data of the individual communication to a communications service provider or carrier that is identified as a source of the individual communication, wherein the call data identifies the instance of the given one of the one or more unwanted communication campaigns having originated from users or accounts of the communications service provider or carrier.

2. The method of claim 1 further comprising scoring the communications service provider based on the identification that the individual communication originated from users or accounts of the communications service provider or carrier.

3. The method of claim 1 further comprising transmitting the call data to additional communications service providers or carriers for further identification and analysis on the individual communication's true origination.

4. The method of claim 1 further comprising providing the communications service provider or carrier with access to an interface that allows a plurality of communications service providers or carriers to collaborate in identifying and classifying behavior of accounts, addresses or communications associated with the plurality of communications service providers or carriers.

5. The method of claim 4 wherein the collaboration includes an indication that a given communications service provider or carrier originated the communications or communication addresses were co-opted by another communications service provider, or a network associated with the given communications service provider or carrier was an intermediary from an additional communications carrier.

6. The method of claim 1 wherein the call data includes a recipient address including a phone number, an originating address, a timestamp, or a facilitating communications service provider or carrier.

7. The method of claim 1 wherein the call data includes data relevant to a non-interconnected communications network where numeric addresses other than phone numbers are used to identify source and destination parties that facilitates grouping of communication campaigns as being originated to one or more of a set of originating addresses.

8. The method of claim 1 further comprising associating the one or more unwanted communication campaigns to a plurality of communications service providers or carriers.

9. The method of claim 1 further comprising:
   receiving feedback from the communications service provider or carrier, the feedback including a matching of the individual communication to evidence of origination at the communications service provider or carrier; and
   transmitting additional instances of supporting communications of the given unwanted communication campaign from a history of instances of communications originated or received by the communications service provider or carrier.

10. A system for determining unwanted call origination, the system comprising:
    a communication campaign database that stores data of one or more unwanted communication campaigns, the one or more unwanted communication campaigns including a grouping of related fingerprints that identify a sequence of characters, audio or video speech associated with instances of a same likely unwanted communication campaign;
    a communication campaign analysis system configured to:
      identify an individual communication as an instance of a given one of the one or more unwanted communication campaigns by matching a fingerprint of the individual communication to the given unwanted communication campaign; and
      transmit call data of the individual communication to a communications service provider or carrier that is identified as a source of the individual communication, wherein the call data identifies the instance of the given one of the one or more unwanted communication campaigns having originated from users or accounts of the communications service provider or carrier.

11. The system of claim 10 further comprising a directory server configured to score the communications service provider based on the identification that the individual communication originated from users or accounts of the communications service provider or carrier.

12. The system of claim 10 wherein the communication campaign analysis system is further configured to transmit the call data to additional communications service providers or carriers for further identification and analysis on the individual communication's true origination.

13. The system of claim 10 wherein the communication campaign analysis system is further configured to provide the communications service provider or carrier with access to an interface that allows a plurality of communications service providers or carriers to collaborate in identifying and classifying behavior of accounts, addresses or communications associated with the plurality of communications service providers or carriers.

14. The system of claim 13 wherein the collaboration includes an indication that a given communications service provider or carrier originated the communications or communication addresses were co-opted by another communications service provider, or a network associated with the given communications service provider or carrier was an intermediary from an additional communications carrier.

15. The system of claim 10 wherein the call data includes a recipient address including a phone number, an originating address, a timestamp, or a facilitating communications service provider or carrier.

16. The system of claim 10 wherein the call data includes data relevant to a non-interconnected communications network where numeric addresses other than phone numbers are used to identify source and destination parties that facilitates grouping of communication campaigns as being originated to one or more of a set of originating addresses.

17. The system of claim 10 wherein the communication campaign analysis system is further configured to associate the one or more unwanted communication campaigns to a plurality of communications service providers or carriers.

18. The system of claim 10 wherein the communication campaign analysis system is further configured to:
   receive feedback from the communications service provider or carrier, the feedback including a matching of the individual communication to evidence of origination at the communications service provider or carrier; and
   transmit additional instances of supporting communications of the given unwanted communication campaign from a history of instances of communications originated or received by the communications service provider or carrier.

* * * * *